Feb. 5, 1957 E. W. ROBINSON 2,780,357
FLOW CONTROL AND TREATMENT OF CONDENSER COOLING WATER MAKE-UP
Filed Sept. 14, 1953 2 Sheets-Sheet 1

Elbert W. Robinson
INVENTOR.

Feb. 5, 1957 E. W. ROBINSON 2,780,357
FLOW CONTROL AND TREATMENT OF CONDENSER COOLING WATER MAKE-UP
Filed Sept. 14, 1953 2 Sheets-Sheet 2
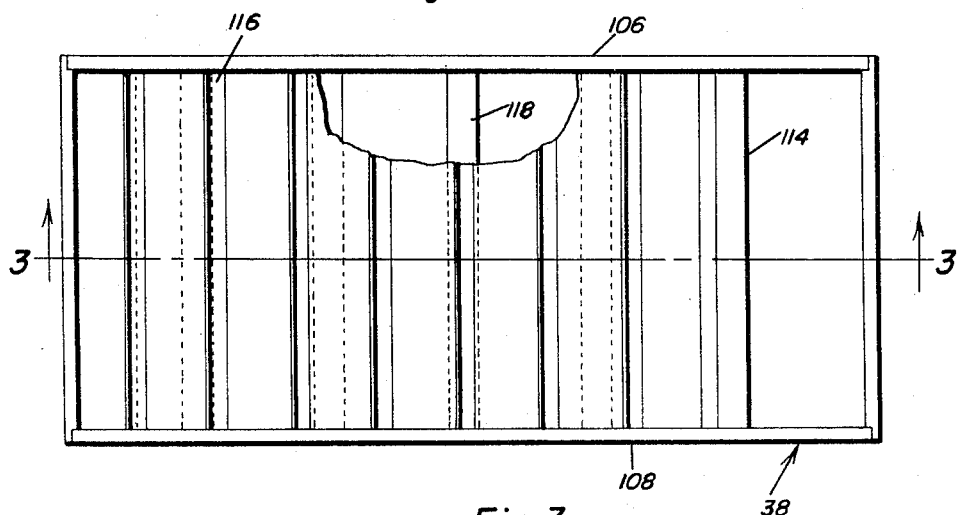
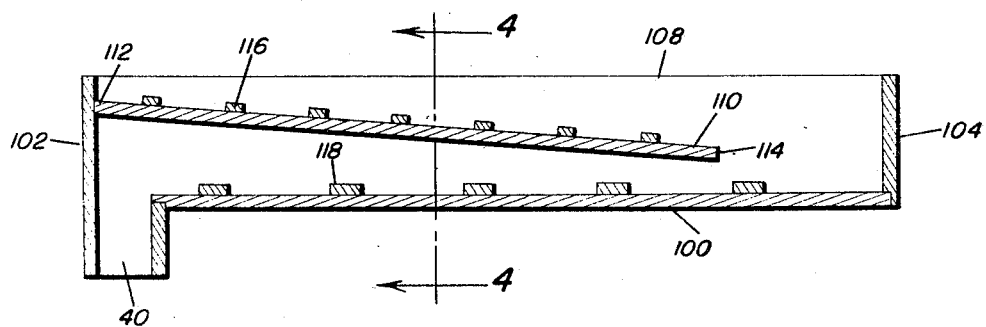
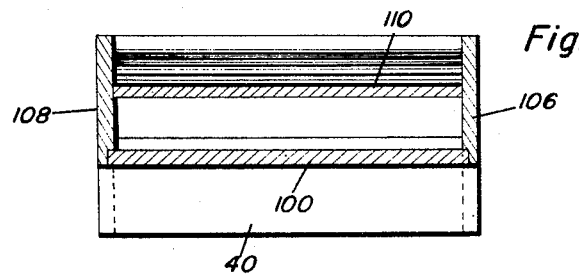
Elbert W. Robinson
INVENTOR.

United States Patent Office 2,780,357
Patented Feb. 5, 1957

2,780,357

FLOW CONTROL AND TREATMENT OF CONDENSER COOLING WATER MAKE-UP

Elbert W. Robinson, Amarillo, Tex.

Application September 14, 1953, Serial No. 379,850

14 Claims. (Cl. 210—31)

This invention relates to a flow control and treating system for condenser cooling water and particularly to a system for automatically supplying chemical and make-up water to maintain the quantity and mineral concentrations in the cooling system below predetermined levels.

In the operation of a condenser cooling system utilizing recirculating cooling water, it is necessary to evaporate a portion of the water in order to dissipate the heat received from the condenser and to constantly bleed off a portion of the recirculating water in order to maintain the concentration of minerals and other scale producing materials below a predetermined level. The concentration of scale producing materials may be materially controlled, or the effect thereof controlled, by adding certain water treating chemicals to the recirculating material, to coact with or neutralize the scale producing materials. Usually, sulphuric acid is the neutralizing agent, but various treating agents or chemicals may be utilized. Heretofore, it has been customary to use a manual system of restoring the quantity of water and also of adding the chemicals to neutralize the scale forming materials. This has heretofore required frequent testing of the returning or recirculating water so that the concentration of minerals may be periodically drained off and refilled, or make-up water supplied as may be necessary to maintain the concentration of scale forming materials below a predetermined level.

The present invention provides a system for automatically draining off a portion of the recirculating water so that the recirculating water will be constantly maintained at a mineral concentration below a predetermined value. Further, an automatic system is provided for supplying make-up proportional to the water lost by evaporation and also proportional to the water lost by blow-down, or bleeding so that the quantity of water in the system remains substantially constant while treating chemicals are supplied to the system in response to the quantity of make-up water supplied.

This is accomplished by means of a system utilizing a flow meter to determine the quantity of condensate produced by the condenser and using the quantity of condensate to control the quantity of blow-down or bleed. The quantity of blow-down is determined and a total of the condensate and blow-down quantities used to control a pressure actuated valve for controlling the quantity of make-up water added to the system. A flow meter responsive to the quantity of make-up water is then utilized to control a plurality of chemical dispensing pumps so that a quantity of treating chemical will be supplied in proportion to the make-up water utilized. Further, a float control system is provided in overriding relation with the control of the make-up water so that an undesirable level of the cooling water will override the otherwise automatic system and cause a flow or cessation of flow of make-up water as may be necessary to control the level of the cooling water in the system.

It is accordingly an object of the invention to provide an automatic water treating system.

It is a further object of the invention to provide an automatic water supply system.

It is a further object of the invention to provide an automatic control system for maintaining the chemicals or concentration of minerals in a recirculating system at a predetermined value.

It is a further object of the invention to provide a recirculating cooling system having a constant supply of coolant therein.

Other objects and many of the attendant advantages of the present invention will be apparent from the following description, taken in conjunction with the accompanying drawing in which:

Figure 2 is a top plan view of the acid mixing trough used in the system with parts broken away;

Figure 3 is a sectional elevation of the mixing trough taken substantially on the plane indicated by the section line 3—3 of Figure 2; and, Figure 4 is a cross-section taken substantially on the plane indicated by the section line 4—4 of Figure 3.

Figure 1:
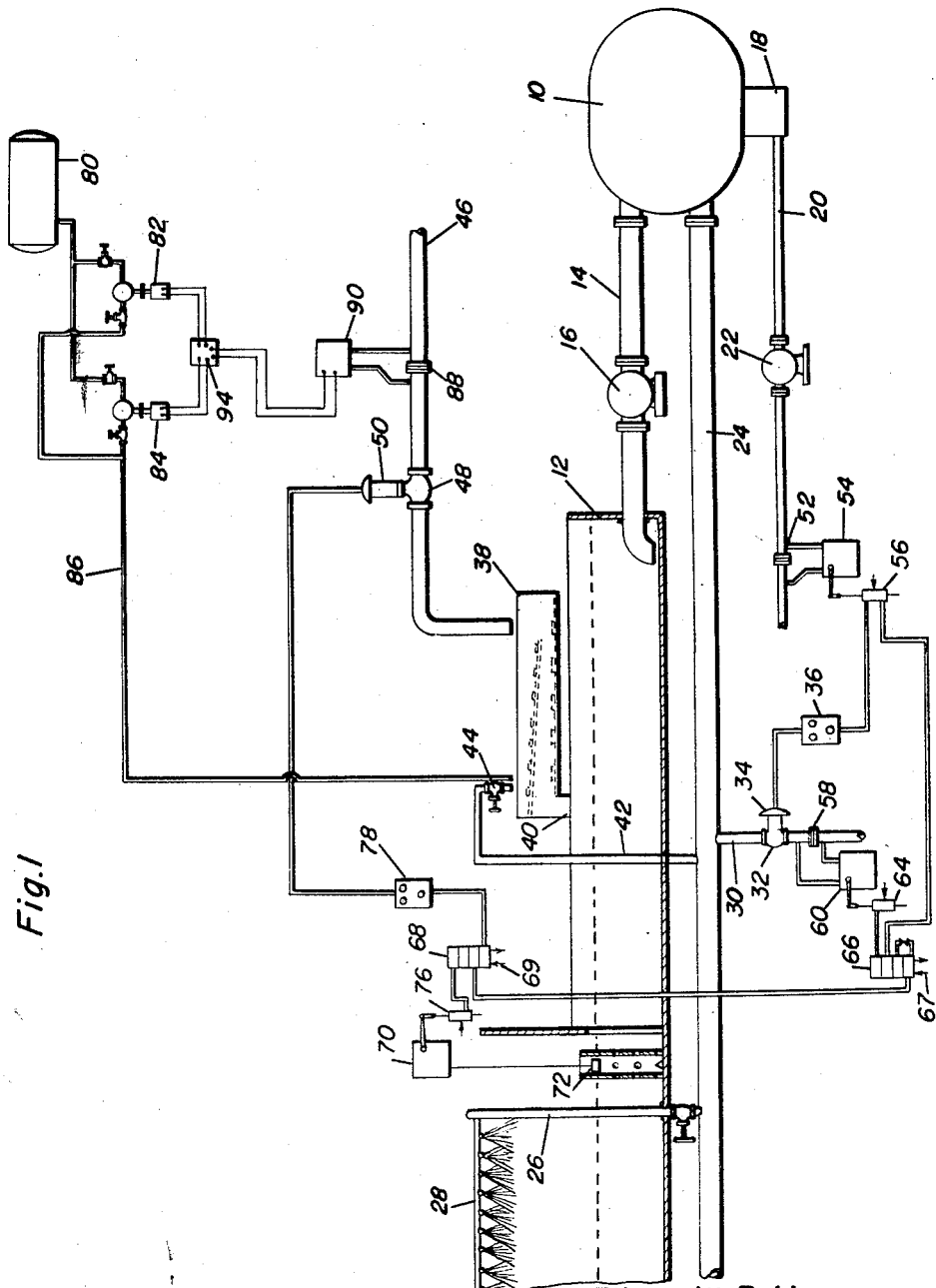
Figure 1 is a schematic illustration of a cooling water treating system according to the invention.

In the exemplary embodiment according to the invention, a condenser 10 is supplied with cooling water from a cooling water sump 12 by means of a flow conduit 14 having a cooling water pump 16 therein. The condenser 10 is provided with a hot well 18 in which the condensate is received, and a condensate line 20 is provided with a pump 22 for discharging the condensate from the hot well.

A hot water discharge line 24 is connected to the condenser 10 so that the warm condensing water is discharged through the line 24 to risers 26 of a sprinkler system 28 which supplies the warm water in a spray so that the water will be cooled by evaporation and the cooled water will fall into the sump 12.

A blow-down or bleeder line 30 is connected to the hot water return line 24 and preferably adjacent the hotter end of the return line so that a portion of the returning hot water will be bled off through the blow-down line 30. A control valve 32 is placed in the blow-down line 30 and is provided with a pneumatic actuator 34 which will be energized through a selector 36 in a manner presently to be described.

A mixing trough 38 is mounted above the sump 12 and is provided with an out-flow aperture 40 so that material in the trough 38 may flow into the sump 12. A recirculating water conduit 42 is connected to the recirculating conduit 24 and is provided with a valve 44 so that a desired quantity of warm recirculated water may be delivered into the mixing trough 38.

A make-up water conduit 46 receives make-up water from any suitable source and is provided with a control valve 48. So that the quantity of make-up water may be controlled, a pneumatic actuator 50 is provided for the valve 48 so that the opening of the valve 48 may be automatically controlled in response to the requirements of make-up water.

A restricted orifices 52 is provided in the condensate line 20 and a flow meter 54 is connected around the orifice 52 to measure the quantity of condensate passing through the orifice. A pilot valve 56 similar to that disclosed in Johnson 2,054,464 is controlled by the meter 54 so as to provide a pneumatic pressure proportional to the condensate passing through the line 20. The pneumatic pressure produced by the pilot valve 56 is connected to the selector 36 so that valve 32 through selector valve 36, similar to that disclosed in Gorrie 2,202,286, so valve 32 will respond to the quantity of flow of condensate in the line 20.

The blow-down line 30 is provided with an orifice 58, and a blow-down flow meter 60 is connected across the orifice 58 to respond to the flow of blow-down fluid in the conduit 30. A pilot valve 64 is actuated by meter 60 to provide a pneumatic pressure proportional to the flow of blow-down fluid in the line 30. The pneumatic pressure produced by pilot valve 64 is taken to standardizing relay 66. Relay 66 responds conjointly to these fluid pressures to produce a fluid pressure applied to averaging relay 68.

A liquid level meter 70 is controlled by means of a float 72 so that the level of the fluid in the sump 12 will be constantly sensed and manifested by actuation of a pilot valve 76 to provide a pressure proportional to the level. The pressure produced by the valve 76 is taken to relay 68, and the outputs of valve 67 and valve 76 will then be combined and applied to controller 50 of the valve 48 through selector valve 78 so that the valve 48 will normally be controlled by the amount of condensate and bleed water being taken, but provided so that the level indicator may override the output of relay 66 and open the valve 48 or close the valve 48 as may be desired to maintain the level in the sump 12 at the proper point. Averaging relay 68 may be similar to that of Dickey 2,098,913. Otherwise, the valve 48 will be continuously controlled automatically in response to the flow of condensate and the amount of blow-down fluid being drawn off.

A chemical tank herein indicated as an acid tank 80 is provided for supplying treating chemicals to the system, and a pair of pumps 82 and 84 are connected in parallel to the acid tank 80 and an acid delivery line 86 which delivers acid from the tank 80 into mixing tank 38.

The make-up water line 46 is provided with an orifice 88 and a flow meter 90 is connected across the orifice 88 to produce an electrical quantity proportional to the flow of make-up water through the conduit 46. An integrator contactor is included in meter 90, making a combination similar to that disclosed in Woolley 1,892,-184, to supply impulses to a timer 94 in proportion to the flow of water in the conduit 46. The timer 94, which may be a variation of the mechanism manufactured by Eagle Signal Corporation, Moline, Illinois and disclosed in their Bulletin 110, dated August 1950, will alternately energize the pumps 82 and 84 to deliver measured quantities of treating chemical as frequently as may be desired so that the portion of treating chemical will be proportional to the amount of make-up water added.

The make-up trough 38 is provided with a bottom member 100, end members 102 and 104, and side members 106 and 108. An inclined partition 110 is mounted between the walls 106 and 108 and sealed in preferably water-tight relation thereto, and the higher end 112 of the partition 110 is sealed to one end such as the end 102 of the trough 38, while the lower end, such as 114, is terminated in spaced relation from the other end 104 of the tank and also in spaced relation from the bottom 100 of the trough.

The inclined partition 110 is provided with transverse cleats or turbulators 116 while the bottom is also provided with turbulators 118.

In the operation of the device according to the invention, it is found that it is necessary to evaporate a quantity of water substantially equal to the quantity of condensate in order to cool the water sufficiently to recirculate. In other words, the B. t. u.'s absorbed in the condenser to condense a pound of steam will be given up to evaporate substantially a pound of water in the cooling tower or other evaporating cooler. Tests of the quantity of scale producing material in the water will be conducted to determine the quantity of the concentration that may be permitted. For example, if the concentration permissible is three times the quantity of minerals in the make-up water, it will be necessary to constantly remove an amount of concentrated cooling water equal to one-third of the water evaporated in order to eliminate the chemicals contained therein and thus maintain the concentration below the predetermined amount.

In operation of the cooling system, the pump 16 will deliver water through the condenser 10 and back through the return line 24 while the blow-down line 30 will take a quantity of the hot water so that energy will not be expended in cooling water which will be blown down. A quantity of hot water will constantly be delivered through the conduit 42 into the mixing trough 38 and the treating chemicals will be delivered through the pipe 86 in substantial proximity to the entrance of the hot water through the conduit 42 so that the hot water and the chemical will mix while the cold or make-up water will be added at the opposite end of the trough so that the mixed hot water and chemiial will then mix with the cold water while substantially flowing in the reverse direction through the trough 38 and into the sump 12. The opening of the valve 48 will be controlled in response to the flow of condensate in the conduit 20, and the blow-down fluid in the conduit 30. The actuation of the valve 48 being automatic as long as the level in the sump 12 remains within a predetermined range. However, if the level in the sump should be too high or too low, the float controlled meter 70 will take over and override the automatic equipment to control the water level irrespective of the amount of condensate being drawn off. The pumps 82 and 84 will deliver treating chemical to the tank 38 in response to the quantity of make-up water being added through the valve 48, and the make-up water will be mixed with the recirculating water so that the water will be constantly chemically treated to control the amounts of impurities therein.

It will thus be seen that the present invention provides a treating system which automatically treats and controls the flow of make-up water so that the water will constantly be maintained in a predetermined level and at a predetermined level of impurities so that the water may be continuously recirculated substantially without supervision.

For purposes of exemplification, a particular embodiment of the invention has been shown, and described according to the best present understanding thereof. However, it will be apparent to those skilled in the art that changes and modifications in the construction and arrangement of the parts thereof may be readily resorted to without departing from the true spirit of the invention.

What is claimed as new is as follows:

1. A cooling system including, a reservoir of cooling medium, a spraying means for the medium to lower its temperature by evaporation, a heat exchanger supplied by the medium to absorb heat from a fluid flowing through the exchanger, a meter for the cooled fluid out of the exchanger as a measure of the medium evaporated by spraying to dissipate the heat absorbed, a supply of cooling medium conducted to the reservoir, a meter for the cooling medium supplied the reservoir, a valve controlling the cooling medium supplied the reservoir and adjusted by the meter for the cooled fluid, a source of chemical which will neutralize characteristics of solids in the medium not removed by evaporation, and a regulator controlling the chemical added and adjusted by the meter of the cooling medium supplied the reservoir.

2. The cooling system of claim 1 including, a conduit for bleeding a portion of the medium from the system after its absorbs heat from the fluid flowing through the exchanger and before it is sprayed to lower its temperature, and a valve in the bleed conduit adjusted by the meter for the cooled fluid out of the exchanger.

3. The cooling system of claim 2 including, a meter for the bled portion of the medium, and means through which the bled medium meter adjusts the valve controlling the cooling medium supplied the reservoir.

4. The cooling system of claim 3 in which, the cooling medium is water, the heat exchanger is a steam condenser through which the water is circulated to condense steam as the fluid flowing through the condenser, the meters establish pneumatic pressures in response to their flows for adjustment of the valves and regulator, and including a standardizing relay through which the meter for the condensed steam and the meter for the bled portion of the cooling water conjointly adjust the cooling water supplied the reservoir.

5. The cooling system of claim 4 including, a meter for the level of cooling water in the reservoir establishing a pneumatic pressure, a second relay receiving output of the standardizing relay and the water level meter to establish a fluid pressure which adjusts the valve controlling the cooling water supplied the reservoir to maintain a predetermined quantity of cooling water in the reservoir.

6. A cooling system including, a reservoir of cooling medium, a spraying means for the medium to lower its temperature by evaporation, a heat exchanger supplied by the medium to absorb heat from a fluid flowing through the exchanger, a meter for the cooled fluid out of the exchanger as a measure of the medium evaporated by spraying to dissipate the heat absorbed, a supply of cooling medium conducted to the reservoir, a conduit for bleeding a portion of the medium from the system after it absorbs heat from the fluid flowing through the exchanger and before it is sprayed to lower its temperature, a meter for the bled portion of the medium, and a valve controlling the cooling medium supplied the reservoir and adjusted conjointly by the meter for the cooled fluid and the meter for the bled portion of the medium.

7. The system of claim 6 including, a valve in the bleed conduit adjusted by the meter for the cooled fluid out of the exchanger.

8. The system of claim 6 including, a meter for the level of cooling medium in the reservoir, and means by which the level meter adjusts the valve controlling the medium supplied the reservoir to maintain a predetermined quantity of cooling medium in the reservoir.

9. The system of claim 6 including, a source of chemical for neutralizing characteristics of solids in the medium not removed by evaporation, a meter for the cooling medium supplied the reservoir, and a regulator controlling the chemical added and adjusted by the meter for the cooling medium supplied the reservoir.

10. The system of claim 9 including, a receptacle through which is passed the chemical added to the cooling medium supplied the reservoir, and a conduit for the medium out of the exchanger for transferring a portion of the medium into the receptacle for mixing with the chemical passing therethrough prior to adding the chemical to the cooling medium of the reservoir.

11. The system of claim 8 in which, the cooling medium is water, the heat exchanger is a steam condenser through which the water is circulated to condense steam as the fluid flowing through the condenser, the meters establish pneumatic pressures in response to their flows for adjustment of the valves, including a standardizing relay through which the meter for the condensed steam and the meter for the bled portion of the cooling water conjointly adjust the valve controlling the cooling water supplied the reservoir, and including a second relay responsive to the output of the standardizing relay as the means by which the level meter adjusts the valve controlling the cooling water supplied the reservoir to maintain a predetermined quantity of cooling water in the reservoir.

12. A cooling system including, a reservoir of cooling medium, a spraying means for the medium to lower its temperature by evaporation, a heat exchanger supplied by the medium to absorb heat from a fluid flowing through the exchanger, a meter for the cooled fluid out of the exchanger as a measure of the medium evaporated by spraying to dissipate the heat absorbed, a supply of cooling medium conducted to the reservoir, a conduit for bleeding a portion of the medium from the system after it absorbs heat from the fluid flowing through the exchanger and before it is sprayed to lower its temperature, a valve controlling the bled portion of the medium from the system, a valve controlling the cooling medium supplied the reservoir, and means with which the meter for the cooled fluid adjusts the two valves in parallel.

13. The system of claim 12 including, a meter for the bled portion of the medium, and means with which the valve controlling the cooling medium supplied the reservoir is adjusted conjointly by the meter for the cooled fluid and the meter for the bled portion of the medium.

14. The system of claim 13 including, a meter for the level of cooling medium in the reservoir, and means by which the level meter adjusts the valve controlling the medium supplied the reservoir to maintain a predetermined quantity of cooling medium in the reservoir.

References Cited in the file of this patent

UNITED STATES PATENTS

| Number | Name | Date |
|---|---|---|
| 211,846 | Hartley | Feb. 4, 1872 |
| 1,877,576 | O'Connor | Sept. 13, 1932 |
| 1,905,244 | Rohlin | Apr. 25, 1933 |
| 1,934,791 | Butzler | Nov. 14, 1933 |
| 2,090,069 | Richardson et al. | Aug. 17, 1937 |
| 2,243,826 | Nielsen et al. | May 27, 1941 |
| 2,312,639 | Gronemeyer | Mar. 2, 1943 |
| 2,345,523 | Ziebolz | Mar. 28, 1944 |
| 2,413,976 | Juliano | Jan. 7, 1947 |
| 2,554,772 | Bereman | May 29, 1951 |
| 2,570,099 | Chapman | Oct. 2, 1951 |
| 2,583,986 | Bahnson | Jan. 29, 1952 |